March 23, 1926.  
F. W. STEWART  
WINDSHIELD CLEANER  
Filed May 31, 1922  
1,577,500  
2 Sheets-Sheet 1
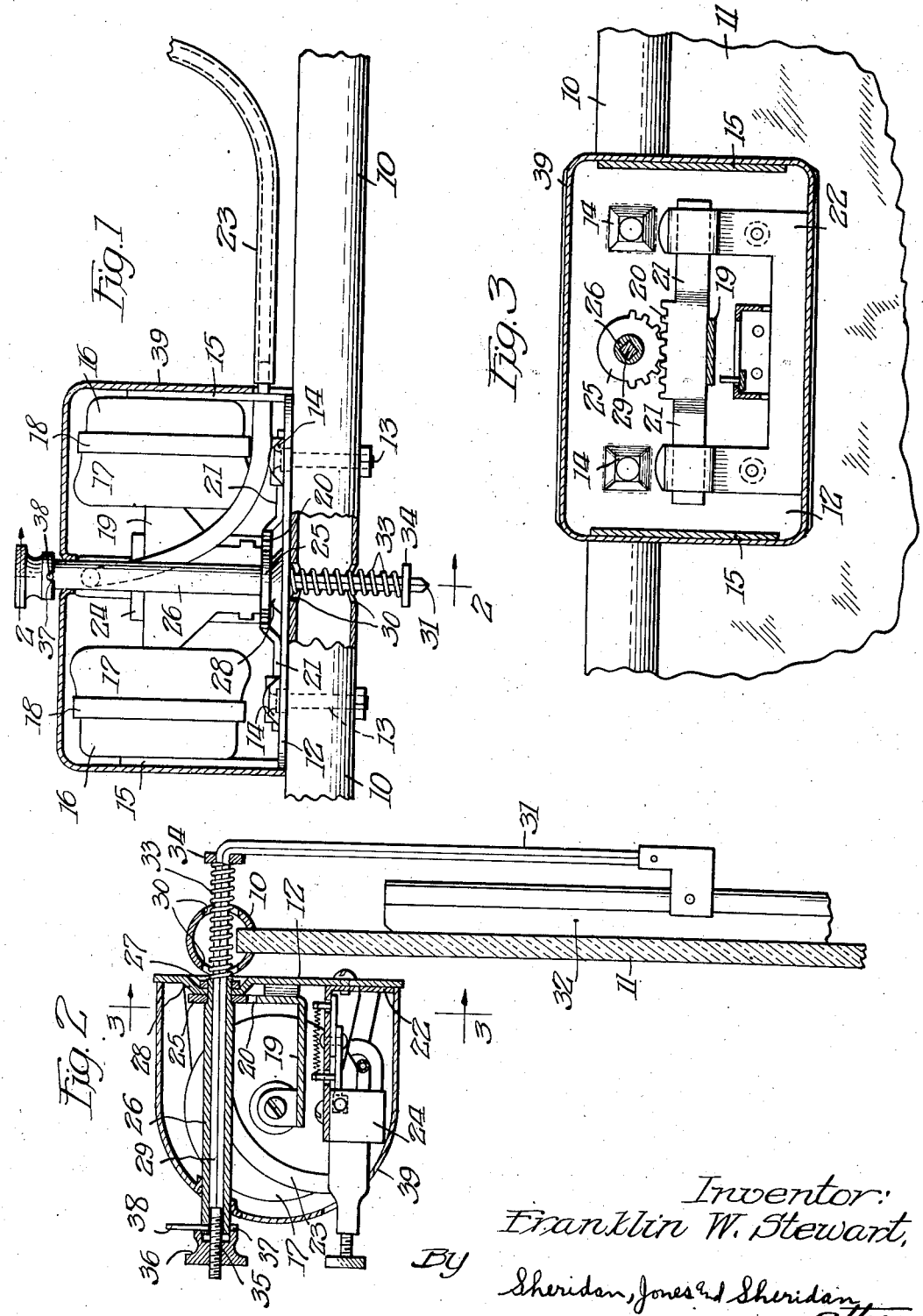
Inventor:
Franklin W. Stewart,
By Sheridan, Jones and Sheridan
attys.

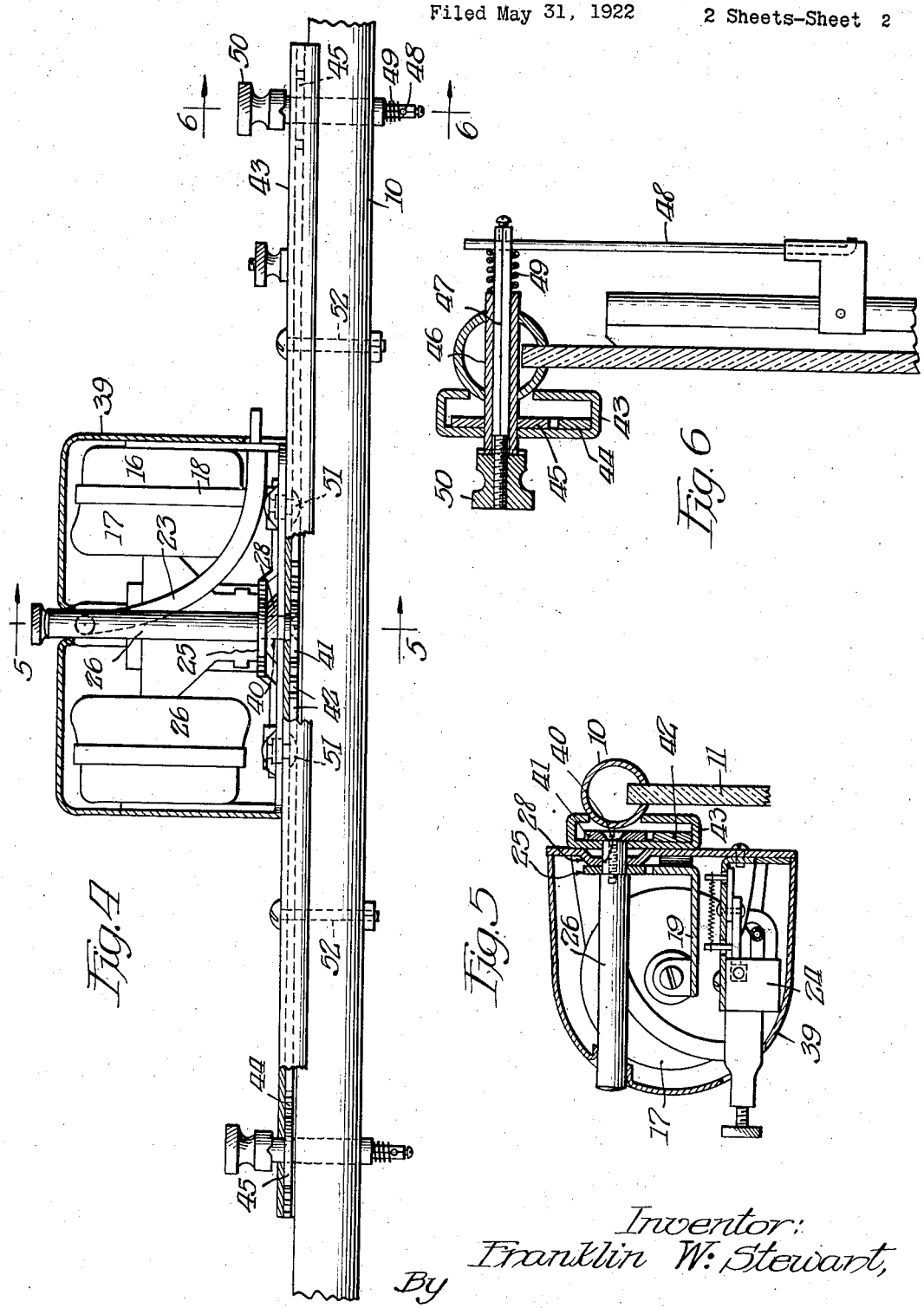

Patented Mar. 23, 1926.

1,577,500

UNITED STATES PATENT OFFICE.

FRANKLIN W. STEWART, OF CHICAGO, ILLINOIS.

WINDSHIELD CLEANER.

Application filed May 31, 1922. Serial No. 564,794.

*To all whom it may concern:*

Be it known that I, FRANKLIN W. STEWART, a citizen of the United States, residing at Chicago, in the county of Cook and State of Illinois, have invented certain new and useful Improvements in Windshield Cleaners, of which the following is a specification.

My invention relates to improvements in windshield cleaners.

The object of the invention is to provide an improved device in which the pressure of the squeegee against the glass may be adjusted readily from within the car and even while the squeegee is operating.

In the accompanying drawings I have illustrated a simple and practical embodiment of my invention, adapted to a windshield cleaner equipped either with one squeegee or with two or more squeegees.

In the drawings—

Figure 1 is a top plan view partly in section of one form of the device;

Fig. 2 is a section on the line 2, 2 of Fig. 1;

Fig. 3 is a section on the line 3, 3 of Fig. 2;

Fig. 4 is a plan view partly in section of a duplex windshield cleaner;

Fig. 5 is a section on the line 5, 5 of Fig. 4; and

Fig. 6 is a section on the line 6, 6 of Fig. 4.

The windshield comprises a suitable frame 10, which may be of any cross-sectional form supporting a pane of glass, 11. The windshield cleaner comprises a supporting plate 12 having bolts 13 or other suitable fastening means which pass through the windshield frame 10 to secure the device in place. The inner ends of said bolts are riveted into struck up bosses 14, in said base 12 whereby the bolts project from a surface which is practically flush throughout.

The base plate 12 is provided with end extensions 15 bent up at right angles to support metal cups 16, each of which has a rubber diaphragm 17 secured thereto by a band 18. The rubber diaphragms are connected by a plate 19 having a bent-up central portion, the middle of which is formed as a rack 20 with end extensions 21 sliding in guides formed on the plate 22. The device is operated by suction from the engine, being connected therewith by tube 23 communicating with suitable valve mechanism 24, not claimed in this application, the arrangement being such, that suction is applied alternately to one or the other of the cup-shaped members 16, thereby reciprocating the rack 20 and rocking the pinion 25 in mesh therewith. (Fig. 3.)

Pinion 25 has a tight fit on a tube 26, which has a washer 27 secured to its outer end and received within a struck-up boss 28 in the base plate 12, whereby the end of said tube is almost flush with the face of said base plate and whereby said tube is held against longitudinal movement by said washer on one side of said base plate and the pinion on the other side. The opening through said tube is polygonal in cross-section, preferably square, and receives a square rod 29 capable of sliding loosely therethrough and passing through aligned openings 30 in the windshield frame 10. The outer end of said rod is provided with a squeegee rod 31, preferably integral therewith and formed by bending down the end of said rod, to the lower end of which squeegee 32 is attached. A spring 33 surrounds the horizontal portion of the rod 29 and is confined between a washer 34 and the end of the tube 26, thereby tending to move the squeegee away from the glass. The inner end of the rod is screw threaded at 35 and provided with a knurled nut 36 whereby said rod may be drawn inwardly against the action of said spring and the nut turned to adjust said squeegee. A groove 37 on said nut fits on a pin 38 in the end of the tube 26, to prevent loosening of said nut. The pin may also be used as a handle for actuating the squeegee by hand. The parts comprising the actuating mechanism of the windshield cleaner are preferably encased in a housing 39.

With the construction provided, it will be apparent that the pressure of the squeegee against the glass may be adjusted to a nicety by the driver from within the car, by turning the nut 36. In devices such as used heretofore, the squeegee rod is some times bent outwardly due to careless handling by garage employes in washing the car, and as a result, the squeegee does not touch the glass at all, or does not engage it sufficiently to be effective. This defect is usually not discovered until the car is driven in the rain and the only way to remedy it is to get out of the car in the rain and bend the rod back, repeated trials resulting in determining the necessary friction to insure proper cleaning of the glass by the squeegee. In the present device, the squeegee may not only be adjusted from within the car as stated but it may be adjusted while it is operating, that is, while it is swinging back and forth. This is of special advantage with snow or sleet, particularly the latter, as the degree of pressure against the glass, in order to remove the sleet, varies under different conditions and as compared with snow or rain. In other words, the operator is enabled to adjust the squeegee while it is operating until the exact pressure is obtained, which is necessary to wipe the sleet from the glass. This pressure can be found only by actual trial. If the sleet changes to snow or rain a further adjustment may be made immediately, lessening the pressure of the squeegee accordingly.

The improvement has been described thus far in conjunction with a single squeegee but it is adapted for use with two or more squeegees where it is desired to clean a larger area of the glass. In Figs. 4, 5 and 6 a duplex cleaner is illustrated in which the suction operating mechanism is identical to that previously described, the corresponding parts being indicated by the same reference characters. The oscillating tube 26 has an outer extension 40 carrying a pinion 41 on the outside of the base plate 12, which pinion meshes with a rack 42. Said rack is mounted within a channel-shaped member 43 and has rack teeth provided at its opposite ends 44, each toothed end meshing with a pinion 45. Each pinion 45 is mounted on a tube 46, similar in general to the one previously described, having a square shaft 47 passing therethrough and carrying a squeegee rod 48 at its outer end with a spring 49 near said outer end and a knurled nut 50 at its inner end whereby each squeegee may be independently adjusted by the operator from within the car. Obviously three or more squeegees may be mounted on the channel-shaped supporting member 43, if desired.

The cleaner is so designed that the same actuating mechanism may be used to operate either a single or two or more squeegees by the simple addition of the pinion 41, which meshes with the rack when said mechanism is mounted on the channel support instead of directly on the windshield frame. The base plate 12 is secured to said channel by rivets 51, and the combined structures are held to the windshield frame by bolts 52.

The duplex squeegee arrangement forms no part of the present invention, being claimed in my copending application 553,048, filed April 15, 1922. The operating mechanism including the valve arrangement also forms the subject-matter of a separate application.

What I claim is:

1. A windshield cleaner comprising a rod, a member rotatable therewith, said rod being slidable relatively to said member, a squeegee arm at the outer end of said rod, a resilient member thereon adjacent said arm tending to urge said rod outwardly of said member and a member on the inner end of said rod cooperating with said first named member for adjusting the squeegee on said arm with reference to the windshield to be cleaned, said adjusting member being arranged to rotate with said rod and to contact only with said first mentioned member rotatable therewith.

2. A windshield cleaner comprising a rod, a member rotatable therewith, said rod being slidable relatively to said member, a squeegee arm at the outer end of said rod, a resilient member thereon adjacent said arm tending to urge said rod outwardly of said member, and a nut on the inner end of said rod cooperating with said first named member for adjusting the squeegee on said arm with reference to the windshield to be cleaned, said nut being arranged to rotate with said rod and to contact only with the said first mentioned member rotatable therewith.

3. In combination with a windshield having a frame with an opening therethrough, a cleaning device comprising a supporting base secured to said frame, a tube rotatably mounted on said base, a rod slidably mounted within said tube but non-rotatable with reference thereto, said rod projecting through said opening, a squeegee carried by the outer end of said rod, the inner end of said rod being screw threaded, and a nut engaging said screw threaded portion and cooperating with said tube whereby rotation of said nut adjusts said rod longitudinally within said tube.

4. In combination with a windshield having a frame with an opening therethrough, a cleaning device comprising a supporting base secured to said frame, a tube rotatably mounted on said base, a rod slidably mounted within said tube but non-rotatable with reference thereto, said rod projecting through said opening, a squeegee carried by the outer end of said rod, the inner end of said rod being screw threaded, a nut engaging said screw threaded portion whereby rotation of said nut adjusts said rod longitudinally within said tube, and a spring normally pressing said rod outwardly.

5. A windshield cleaner comprising a non-circular rod, a rotatable support therefor having a correspondingly shaped non-circular opening through which said rod passes substantially horizontally, the outer end of said rod being bent down to form a squeegee arm, the inner end of said rod being screw threaded and provided with a nut to adjust it with reference to said support and means for rocking said support to actuate said squeegee arm.

6. A windshield cleaner comprising a rotatable member, a rod extending through said member and having a squeegee arm at its outer end, a nut on the inner end of said rod adapted to adjust the same longitudinally within said rotatable member, said rod being non-rotatable relatively to said member, and means for rocking said member to actuate said squeegee arm.

7. A windshield cleaner comprising a supporting plate, an air motor thereon, a rotatable tube passing through said plate having a shoulder thereon with means on the opposite side of said plate for holding said tube against longitudinal movement, a rack and pinion associated with said tube to oscillate the same, a rod slidably mounted in said tube to turn therewith, a spring and a squeegee associated with said rod, and an adjusting means for said rod on the innerside of said supporting plate.

In testimony whereof, I have subscribed my name.

FRANKLIN W. STEWART.